US008423216B2

United States Patent
Yoshimura et al.

(10) Patent No.: US 8,423,216 B2
(45) Date of Patent: Apr. 16, 2013

(54) ENGINE CONTROLLER OF HYBRID VEHICLE

(75) Inventors: Takahiro Yoshimura, Kobe (JP); Tetsuo Maeda, Kobe (JP); Takehisa Fukuda, Kobe (JP); Takeshi Kawakami, Kobe (JP); Toshio Otsuka, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 312 days.

(21) Appl. No.: 12/902,762

(22) Filed: Oct. 12, 2010

(65) Prior Publication Data

US 2011/0257822 A1    Oct. 20, 2011

(30) Foreign Application Priority Data

Apr. 14, 2010   (JP) .................................. 2010-093060

(51) Int. Cl.
B60L 9/00    (2006.01)
(52) U.S. Cl.
USPC .................. 701/22; 180/65.245; 903/903
(58) Field of Classification Search ............. 701/22, 701/36; 180/65.245; 903/903
See application file for complete search history.

(56) References Cited

U.S. PATENT DOCUMENTS

| 6,131,538 A | 10/2000 | Kanai |
| 2002/0163199 A1* | 11/2002 | Ramaswamy et al. ...... 290/40 C |
| 2004/0098970 A1* | 5/2004 | Foster ........................... 60/284 |

FOREIGN PATENT DOCUMENTS

| JP | 10-339183 A | 12/1998 |
| JP | 2982746 B2 | 11/1999 |
| JP | 2000-291460 A | 10/2000 |
| JP | 3991498 B2 | 10/2007 |

* cited by examiner

*Primary Examiner* — Gertrude Arthur Jeanglaude
(74) *Attorney, Agent, or Firm* — Sughrue Mion, PLLC

(57) ABSTRACT

To provide an engine controller of a hybrid vehicle that can perform a forced driving operation of an engine by performing the same inspection procedure as that of a vehicle using only an engine as a drive source even in the hybrid vehicle. The engine controller includes an operation control unit (ECM) that performs forced driving control of the engine to maintain an operation in a predetermined state suitable for an inspection if a determination that the inspection of the engine by a forced driving operation is requested is made, and an operation state determination unit (EVCM) that determines whether the cold start condition is satisfied or unsatisfied based on information containing at least with or without change from the disconnected state to the connected state of the battery. If the cold start condition is satisfied, the forced driving control of the engine is performed by the operation control unit.

5 Claims, 9 Drawing Sheets

ENGINE CONTROLLER OF HYBRID VEHICLE

BACKGROUND OF THE INVENTION

1. Field of the Invention

The present invention relates to an engine controller that controls operation of an engine in a hybrid vehicle including the engine and a motor, and specifically, to an engine controller for forced driving of the engine at inspection of the engine.

2. Description of the Related Art

Hybrid vehicles are divided into a type in which an engine may be a drive source of a vehicle (so-called "parallel hybrid vehicle") and a type in which an engine may not directly be a drive source of a vehicle and mounted mainly for operation of a power generator (so-called "series hybrid vehicle"), and both can travel using only a motor as a drive source with the engine stopped.

The so-called parallel hybrid vehicle that can directly transmit the power of the engine to drive wheels generally travels using the engine as a main drive source during traveling, however, in the case where the power of the engine is not necessary at deceleration and downhill, at initial acceleration, or the like, the vehicle may travel with the engine stopped.

The so-called series hybrid vehicle in which the engine is used only for driving of the power generator charges a secondary cell by activating the power generator using the engine in the case where the remaining capacity of the secondary cell that supplies power to the motor becomes lower or the like, and stops the engine when the remaining capacity of the secondary cell is restored.

As described above, in the hybrid vehicles, even when the starter switch is in the operation state, the engine operates and stops according to the remaining capacity of the secondary cell and the traveling condition of the vehicles. In a vehicle using only an engine as a drive source, the engine continues to operate unless the starter switch is turned into the stopped state, and the hybrid vehicle is largely different from the vehicle using only the engine as the drive source in the above point.

In such a hybrid vehicle, as is the case of the vehicle using only the engine as the drive source, an inspection of the engine is necessary at regular intervals or failures. Since the engine mounted on the hybrid vehicle has basically the same configuration as that of an engine mounted on the conventional vehicle using only the engine as the drive source, the inspection method of the operation of the engine is performed in the same manner as the inspection method in the conventional vehicle.

As described above, the inspection of the operation of the engine is necessary even in the hybrid vehicle, and it is necessary to operate the engine in various operation states at inspection. However, as described above, the hybrid vehicle stops the operation of the engine when a predetermined condition that the remaining power of the secondary cell is sufficient or the like is satisfied. Therefore, depending on the charged state of the secondary cell or the like, the operation of the engine may not be maintained at inspection, and a problem arises in the inspection.

Accordingly, as a related technology conceived to maintain the operation of the engine and cause no problem in inspection, there is Japanese Patent No. 2982746. According to the technology, inspection state determination means for determining whether the inspection of the operation of the engine is performed or not is provided, and the operation of the engine is maintained in the state suitable for inspection regardless of the satisfaction of the operation stop conditions that characterize the hybrid vehicles.

Further, as a related technology conceived to maintain the operation of the engine in the state suitable for inspection, as shown in Japanese Patent No. 3991498, there is a technology of performing the operation of the engine when a predetermined operation set for inspection is detected.

In Japanese Patent No. 2982746, in order to perform the inspection of the engine, the inspection state determination means for determining whether the inspection of the operation of the engine is performed or not is provided, and an inspection tool for turning an inspection terminal dedicated for vehicle into the inspection state is necessary.

Further, in Japanese Patent No. 3991498, the inspection state can be determined using the inspection state determination means by performing a special operation and an inspection can be performed without the inspection tool, however, it is necessary to acquire a special operation procedure in addition to the normal operation for starting up the vehicle. Further, it is necessary to perform a special operation in a driver's seat when the inspection is performed and necessary to enter the driver's seat to perform the special operation at each time of the performance of the inspection of the engine. Accordingly, there are problems of poor work efficiency because it is impossible to perform an inspection without knowledge of the special operation procedure for starting up the vehicle at the inspection in a dealer or the like, and it is necessary for a worker to enter the driver's seat for performing the special operation at the shipping inspection in the factory.

SUMMARY OF THE INVENTION

The invention has been achieved to solve the above described problems. A purpose of the invention is, in a hybrid vehicle, to provide an engine controller of the hybrid vehicle that can perform a forced driving operation of an engine and can perform the same inspection procedure as that of a vehicle using only an engine as a drive source even in the hybrid vehicle without the necessity of a dedicated inspection tool or performance of a predetermined operation set for the inspection.

The invention is to provide an engine controller of a hybrid vehicle in which an engine and a motor are provided, a battery is charged by an output of a power generator driven by the engine, and the motor is driven by the battery. The engine controller includes an operation control unit that performs forced driving control of the engine to maintain an operation in a predetermined state suitable for an inspection if a determination that the inspection of the engine by a forced driving operation is requested is made, and an operation state determination unit that determines whether a cold start condition is satisfied or unsatisfied based on information containing at least with or without change from the disconnected state to the connected state of the battery. If the cold start condition is satisfied, the forced driving control of the engine is performed by the operation control unit.

According to the invention, whether the hybrid vehicle is under normal control or inspection by the forced driving of the engine can accurately be determined, and can easily perform the same inspection procedure as that of a vehicle using only an engine as a drive source even in the hybrid vehicle without the necessity of a dedicated inspection tool or performance of a predetermined operation set for the inspection.

The foregoing and other object, features, aspects, and advantages of the present invention will become more apparent from the following detailed description of the present invention when taken in conjunction with the accompanying drawings.

DETAILED DESCRIPTION

Embodiment 1

Figure 1:
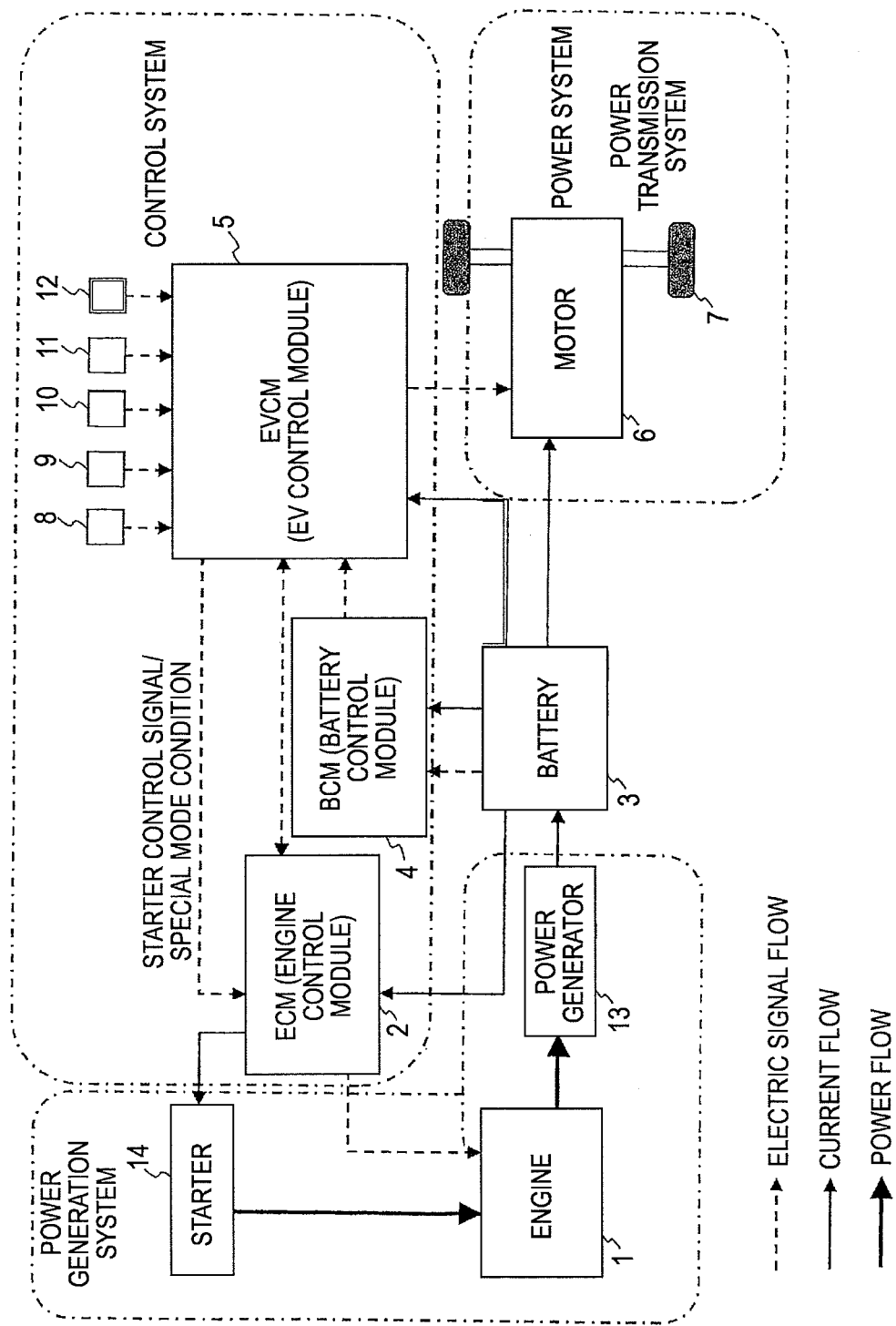
FIG. 1 is a system configuration diagram according to embodiment 1 of the invention.

Embodiment 1 of the invention will be explained based on the drawings. FIG. 1 shows a schematic configuration of a hybrid vehicle incorporating an operation controller as embodiment 1 of the invention.

The configuration of the hybrid vehicle broadly includes a power system that generates drive power, a power generation system that generates electric power, a control system that performs control of them, an operation transmission system that transmits the drive power from a power source to drive wheels 7, an drive operation unit, etc.

Further, the power system includes a motor 6, the power generation system includes an engine 1, a power generator 13, and a starter 14, and the control system includes an engine control module (hereinafter, referred to as "ECM") 2 for mainly controlling the engine 1, an EV control module (hereinafter, referred to as "EVCM") 5 that mainly controls the operation of the motor 6, a battery control module (hereinafter, referred to as "BCM") 4 that inputs necessary information from a battery 3 and a sensor (not shown) attached to the battery 3 and outputs it to the EVCM 5, and various sensor parts that detect and input and output signals necessary for the ECM 2 and the EVCM 5.

Although the internal configurations of the ECM 2, the EVCM 5, and the BCM 4 are not shown, these are one-chip microcomputers each having a CPU, a ROM, a RAM, etc. inside, and adapted so that the CPU performs the following various control processing according to programs recorded in the ROM. The engine controller in the embodiment 1 includes the above described ECM 2 and EVCM 5.

The operation of the engine 1 is controlled by the ECM 2. The control of the engine 1 performed by the ECM 2 includes ignition time control in response to the number of revolutions of the engine 1, control of the amount of fuel injection in response to the amount of air intake, etc. To enable control of the engine 1, various sensors indicating the operation state of the engine 1 are connected to the ECM 2, however, their illustration is omitted. The power generator 13 that rotates in synchronization with the revolution of the engine 1 is attached to the engine 1. Further, the engine 1 can start by the rotational force of the starter 14.

The motor 6 is electrically connected to the battery 3 and the EVCM 5. Various sensors and switches are electrically connected to the EVCM 5. As the sensors and switches connected to the EVCM 5, there are a shift switch (hereinafter, referred to as "SHIFT SW") 9, an accelerator position sensor 10, an ignition switch (hereinafter, referred to as "IGSW") 11, a brake switch (hereinafter, referred to as "BRAKE SW") 12, a tester 8, etc.

Here, the tester 8 is a tool used at inspection of the hybrid vehicle system, and the tester 8 can take in information of the various sensors and switches and failure detection information by making communication between the EVCM 5 and itself and display the information.

The EVCM 5 makes communication between the ECM 2 and the BCM 4 and itself. The information from the EVCM 5 to the ECM 2 includes requests for starting and stopping of the engine and an amount of requested power generation, and the information from the ECM 2 to the EVCM 5 includes engine rpm information. Further, information of the battery voltage, the remaining battery, the battery temperature, charging and discharging currents, etc. is input from the BCM 4.

The BCM 4 is electrically connected to the battery 3 and inputs the battery voltage, the battery temperature, and amounts of charging and discharging currents. Further, the BCM 4 calculates the remaining battery from the information.

Figure 2:
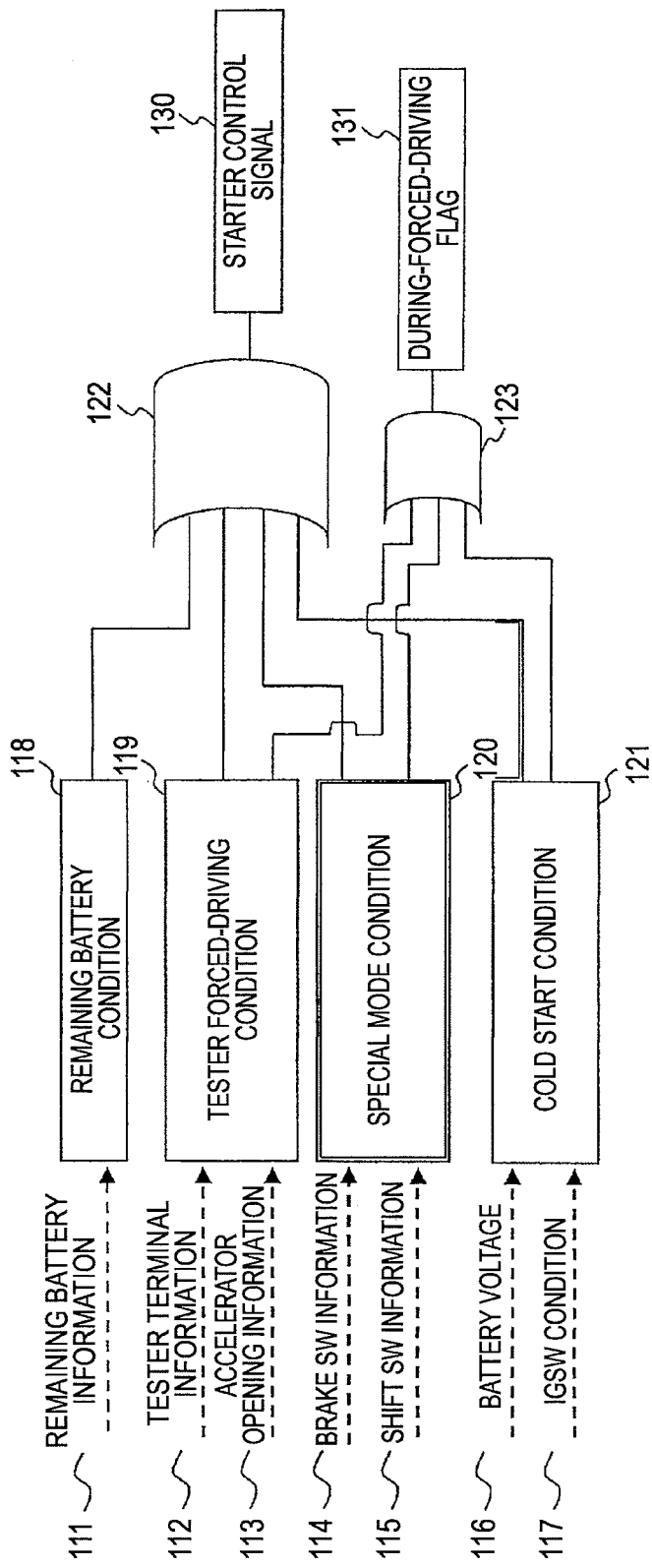
FIG. 2 is a block diagram showing a configuration of embodiment 1.

Next, determination of a starter control signal 130 and determination of a during-forced-driving flag 131 of the EVCM 5 in the embodiment 1 will be explained based on the block diagram of FIG. 2. The starter control signal determination is processing executed regularly at fixed time intervals Ts while the EVCM 5 executes various control processing.

The starter control signal 130 is determined by OR 122 of a remaining battery condition 118, a tester forced-driving condition 119, a special mode condition 120, and a cold start condition 121. Here, the remaining battery condition 118 has remaining battery information 111 as its input and is satisfied when the remaining battery becomes low. The tester forced-driving condition 119 has tester terminal information 112 and accelerator opening information 113 as its inputs, and is satisfied when the tester terminal is connected and the accelerator is not pressed down.

The special mode condition 120 has BRAKE SW information 114 and SHIFT SW information 115 as its inputs. The condition determination will be explained later in detail in the flowchart in FIG. 4.

The cold start condition 121 has a battery voltage 116 and an IGSW condition 117 as input condition. The condition determination will be explained later in detail in the flowchart in FIG. 3.

Further, the during-forced-driving flag 131 is determined by OR 123 of the tester forced-driving condition 119, the special mode condition 120, and the cold start condition 121.

Figure 3:
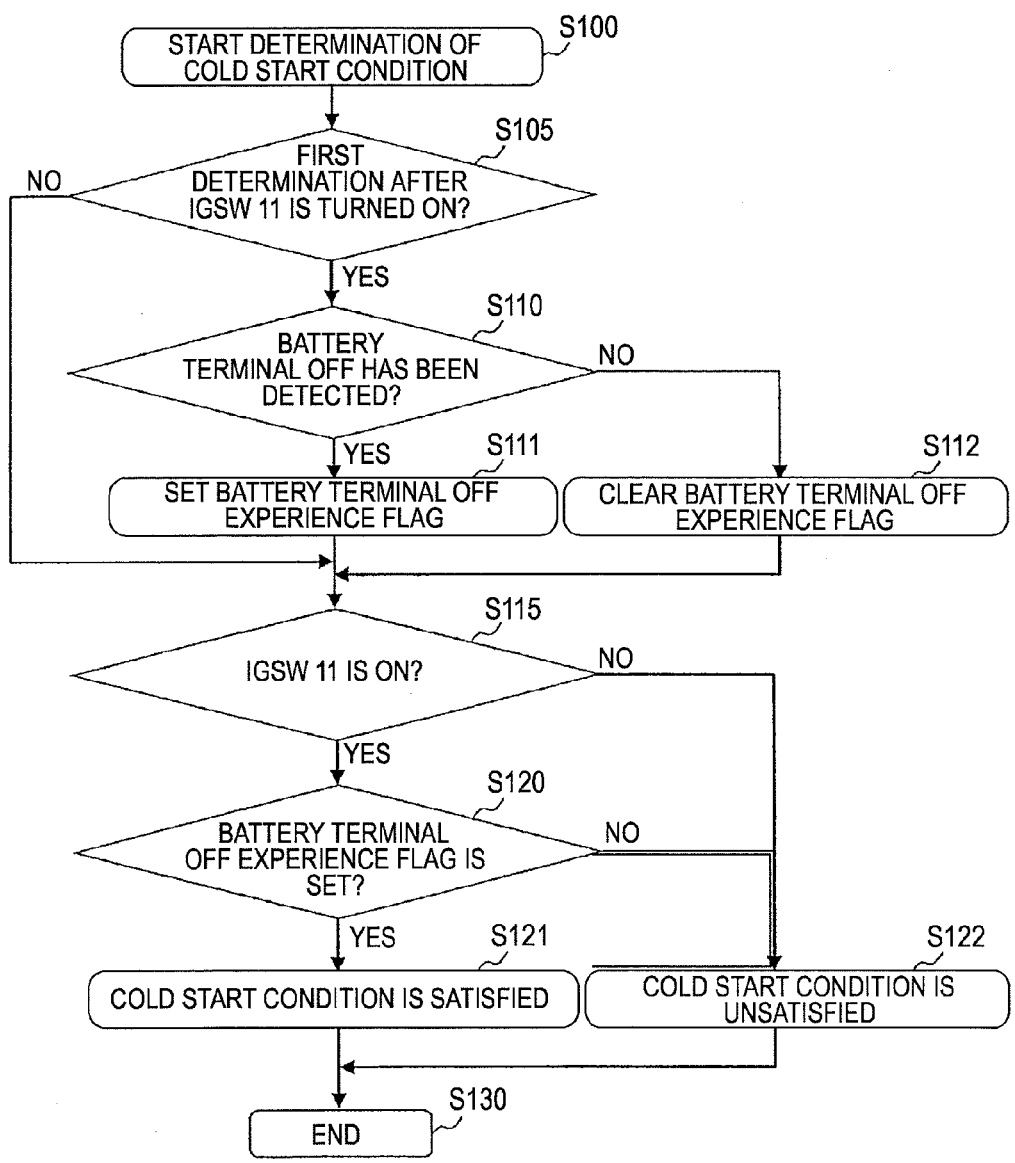
FIG. 3 is a flowchart for explanation of an operation of embodiment 1.

Next, a flow of determination of the cold start condition 121 shown in FIG. 2 will be explained based on a flowchart of FIG. 3.

When the cold start condition determination is started (step S100), the EVCM 5 executes processing for setting or resetting a battery terminal OFF experience flag, and first judges whether the processing for setting or resetting a battery terminal OFF experience flag is the first determination after the IGSW 11 is turned ON or not (step S105).

Here, if the processing is not the first determination after the IGSW 11 is turned ON, the module holds the state of the flag without performing operation of the battery terminal OFF experience flag. If the processing is the first determination after the IGSW 11 is turned ON, the module judges whether the battery terminal has been once turned OFF while the IGSW 11 is OFF or not (step S110).

Here, the judgment as to whether the battery terminal has been turned OFF or not is made by the detection of the change of the value of the RAM as a target of battery backup in the EVCM 5 from the value immediately before the IGSW 11 is turned OFF. If the battery terminal OFF has been detected, the module sets the battery terminal OFF experience flag (step S111).

Further, if the battery terminal OFF has not been detected, the module clears the battery terminal OFF experience flag (step S112).

Then, the module determines whether the IGSW 11 is ON or not (step S115). If the determination result is that the IGSW 11 is OFF, the cold start condition is unsatisfied.

If the IGSW 11 is ON, the module determines whether the battery terminal OFF experience flag having information that has been previously established is set or not (step S120), and, if the flag is set, the cold start condition is satisfied (step S121).

Further, if the battery terminal OFF experience flag has been cleared, the cold start condition is unsatisfied (step S122).

According to the determination flow, if the cold start condition is once satisfied after the IGSW 11 is turned ON, it continues the satisfied state until the IGSW 11 is turned OFF.

Figure 4:
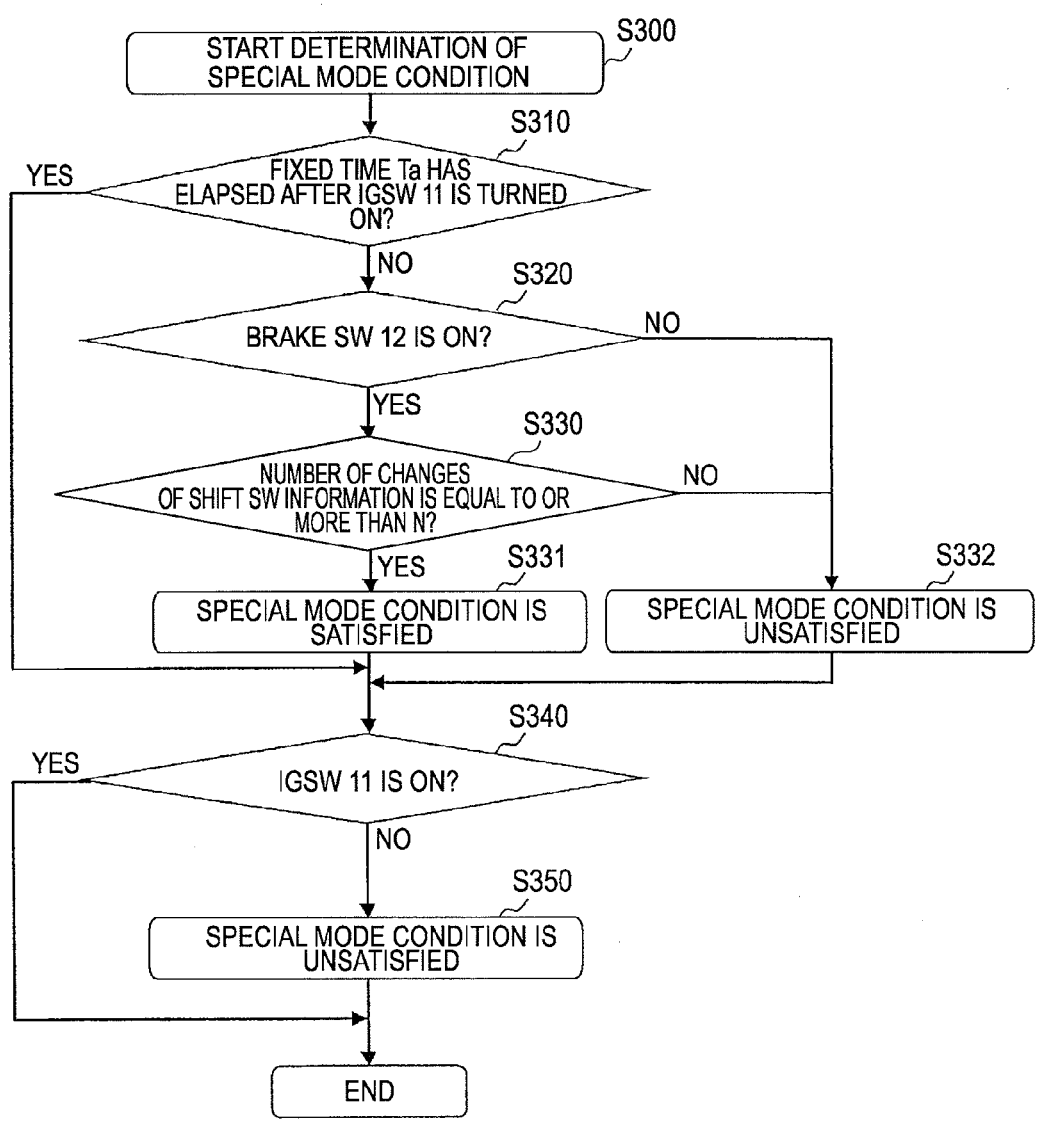
FIG. 4 is a flowchart for explanation of the operation of embodiment 1.

Next, a flow of determination of the special mode condition 120 shown in FIG. 2 will be explained based on a flowchart of FIG. 4.

When the special mode condition determination is started (step S300), the EVCM 5 determines the satisfaction of the special mode condition only in time Ta after the IGSW 11 is turned ON (step S310).

Here, if the BRAKE SW is ON (step S320) and the number of changes of the SHIFT SW information is equal to or more than N (step S330), the special mode condition is satisfied (step S331). Otherwise, the special mode condition is unsatisfied (step S332).

If time Ta has elapsed after the IGSW 11 is turned ON, the module does not perform the operation of the special mode condition. As a result, the special mode condition is held after time Ta has elapsed after the IGSW 11 is turned ON. Then, the IGSW 11 is turned OFF (step S340), the special mode condition is unsatisfied (step S350).

According to the determination flow, if the special mode condition is once satisfied after the IGSW 11 is turned ON, it continues the satisfied state until the IGSW 11 is turned OFF.

Figure 5:
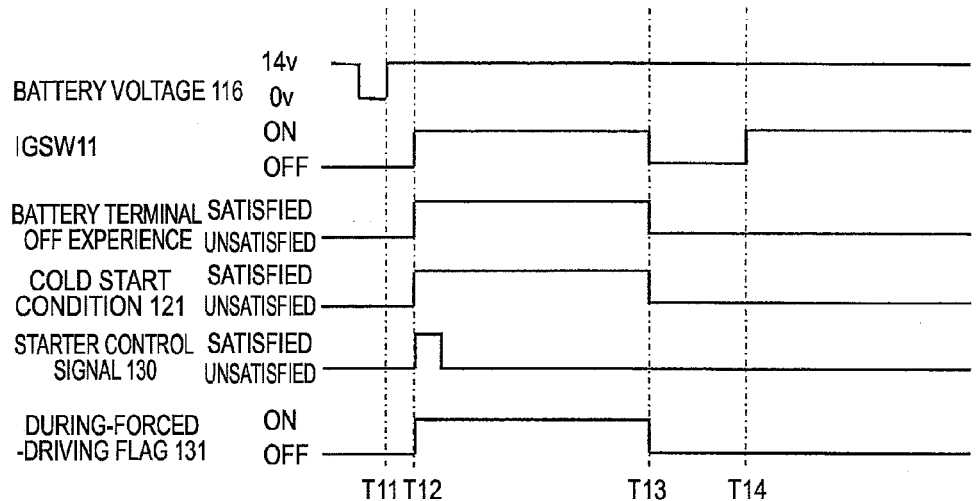
FIG. 5 is a timing chart for explanation of the operation of embodiment 1.

Next, in the flowchart explained in FIG. 3, the operations of the starter control signal 130 and the during-forced-driving flag 131 when the cold start condition 121 is satisfied will be explained based on FIG. 5.

When the battery terminal of the EVCM 5 is turned OFF, the battery voltage 116 once becomes lower to 0 V. If the battery terminal has experienced OFF and the IGSW 11 is turned ON from OFF, the battery terminal OFF experience flag is set and the cold start condition 121 is satisfied.

When the cold start condition 121 is satisfied, the EVCM 5 transmits the starter control signal 130 to the ECM 2 via communication. When the ECM 2 receives the starter control signal 130, it drives the starter 14 and starts the engine 1. If the ECM 2 judges that the engine 1 has completely started, it stops the driving of the starter 14 and transmits an engine start completion signal to the EVCM 5. When the EVCM 5 receives the signal, it stops the transmission of the starter control signal 130.

Further, when the cold start condition 121 is satisfied, the during-forced-driving flag 131 is set, and the EVCM 5 transmits the flag information to the ECM 2 via communication. Since the ECM 2 controls the engine 1 to the driving side while the during-forced-driving flag 131 is set, the engine is forcibly driven.

When the IGSW 11 is turned OFF, the cold start condition 121 becomes unsatisfied, and the starter control signal 130 and the during-forced-driving flag 131 become unsatisfied at the same time. When the during-forced-driving flag 131 is unsatisfied, the ECM 2 stops the driving of the engine 1. When the battery terminal of the EVCM 5 is not turned OFF, the battery terminal OFF experience flag and the cold start condition 121 remain unsatisfied and the starter control signal 130 and the during-forced-driving flag 131 remain unsatisfied, and thereby, the engine 1 is never driven.

Figure 6:
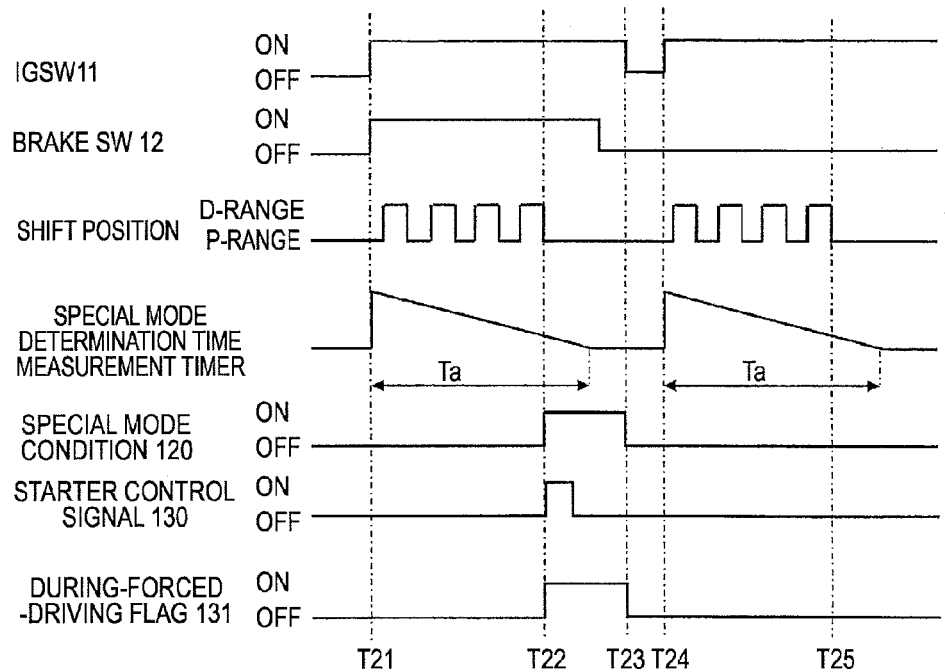
FIG. 6 is a timing chart for explanation of the operation of embodiment 1.

Next, in the flowchart explained in FIG. 4, the operations of the starter control signal 130 and the during-forced-driving flag 131 when the special mode condition 120 is satisfied will be explained based on FIG. 6.

When the IGSW 11 is turned ON from OFF, an initial set value Ta of measurement time is set in a shift position change confirmation timer. The timer is a subtraction timer and subtraction of one is performed at fixed time intervals Ts. While the timer measures the time Ta, the BREAK SW continues ON and, here, when four changes between P-range and R-range are detected, the special mode condition 120 is satisfied.

When the special mode condition 120 is satisfied, the EVCM 5 transmits the starter control signal 130 to the ECM 2 via communication. When the ECM 2 receives the starter control signal 130, it drives the starter 14 and starts the engine 1. If the ECM 2 judges that the engine 1 has completely started, it stops the driving of the starter 14 and transmits an engine start completion signal to the EVCM 5. When the EVCM 5 receives the signal, it stops the transmission of the starter control signal 130.

Further, when the special mode condition 120 is satisfied, the during-forced-driving flag 131 is set, and the EVCM 5 transmits the flag information to the ECM 2 via communication. Since the ECM 2 controls the engine 1 to the driving side while the during-forced-driving flag 131 is set, the engine is forcibly driven.

When the IGSW 11 is turned OFF, the special mode condition 120 becomes unsatisfied, and the starter control signal 130 and the during-forced-driving flag 131 become unsatisfied at the same time. When the during-forced-driving flag 131 is unsatisfied, the ECM 2 stops the driving of the engine 1. When the special mode condition 120 is unsatisfied because the BRAKE SW is OFF, the during-forced-driving flag 131 is not set, and thereby, the ECM 2 never drives the engine 1.

Note that, in the embodiment 1, the change of the SHIFT SW is seen as the number of changes between P-range and D-range, however, a combination with another SHIFT SW may be used. Further, although the combination of the BRAKE SW and the SHIFT SW is used, other SW may be used.

As described above, in the embodiment 1, in an engine controller of a hybrid vehicle in which the engine 1 and the motor 6 are provided, the battery 3 is charged by an output of the power generator 13 driven by the engine 1, and the motor 6 is driven by the battery 3, the engine controller includes an operation control unit (ECM 2) that performs forced driving control of the engine to maintain an operation in a predetermined state suitable for an inspection if a determination that the inspection of the engine 1 by a forced driving operation is requested is made, and an operation state determination unit (EVCM 5) that determines whether the cold start condition 121 is satisfied or unsatisfied based on information containing at least with or without change from the disconnected state to the connected state of the battery 1. If the cold start condition is satisfied, the forced driving control of the engine is performed by the operation control unit. Thereby, whether the hybrid vehicle is under normal control or inspection by the forced driving of the engine can accurately be determined, and can easily perform the same inspection procedure as that of a vehicle using only an engine as a drive source even in the hybrid vehicle without the necessity of a dedicated inspection tool or performance of a predetermined operation set for the inspection.

Embodiment 2

Figure 7:
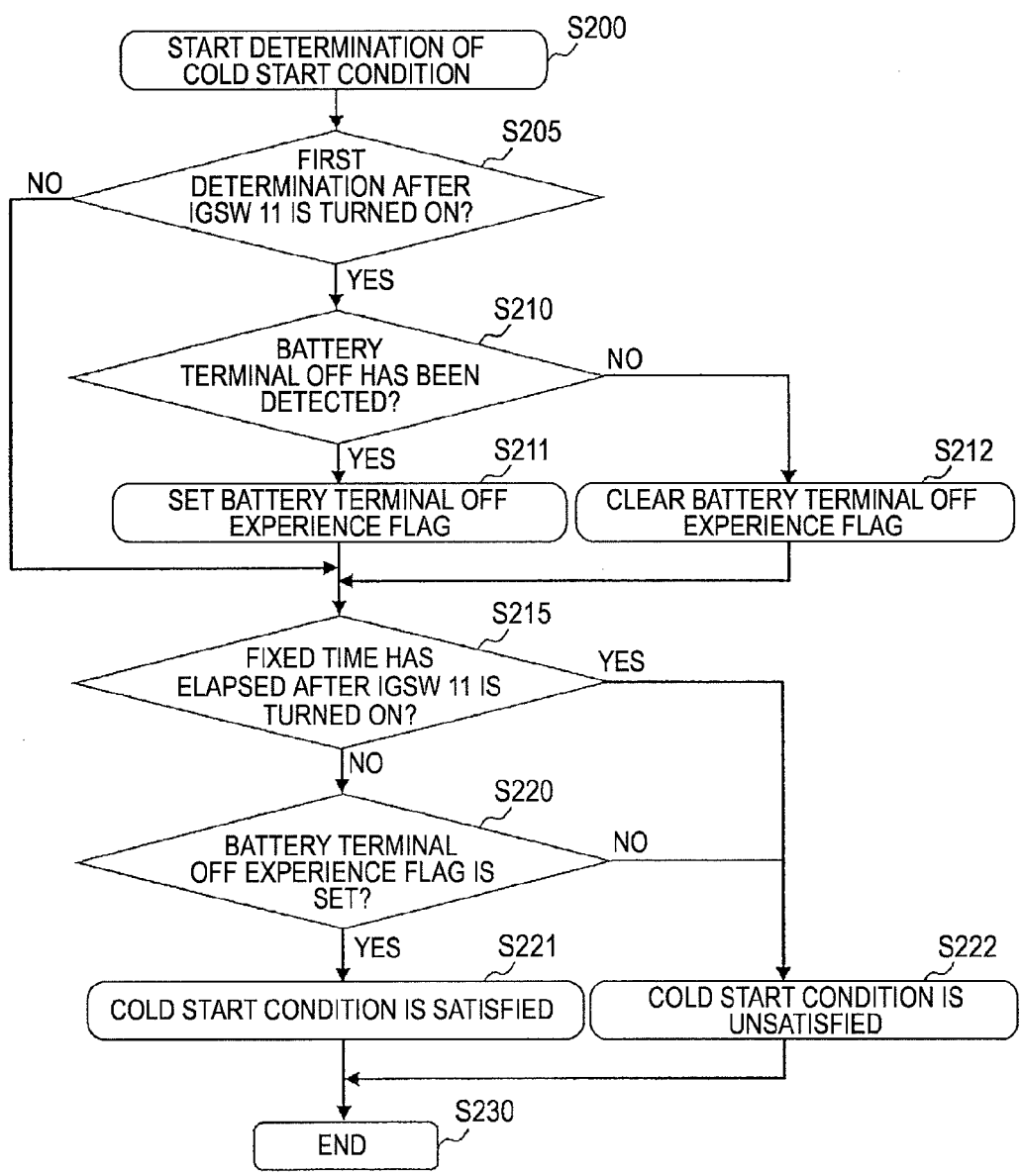
FIG. 7 is a flowchart for explanation of an operation of embodiment 2 of the invention.

Next, determination of a starter control signal and determination of a during-forced-driving flag of the EVCM 5 in the embodiment 2 will be explained based on the flowchart of FIG. 7.

The starter control signal determination and the during-forced-driving flag determination are processing executed regularly at fixed time intervals Ts while the EVCM 5 executes various control processing as is the case of embodiment 1. Here, the system configuration and the block diagram are the same as those of embodiment 1, and their explanation will be omitted.

When the cold start condition determination is started (step S200), the EVCM 5 executes processing for setting or resetting of a battery terminal OFF experience flag, and first judges whether the processing for setting or resetting of the battery terminal OFF experience flag is the first determination after the IGSW 11 is turned ON or not (step S205).

Here, if the processing is not the first determination after the IGSW 11 is turned ON, then, the module holds the state of the flag without performing operation of the battery terminal OFF experience flag. If the processing is the first determination after the IGSW 11 is turned ON, the module judges whether the battery terminal has been once turned OFF while the IGSW 11 is OFF (step S210). Here, the judgment as to whether the battery terminal has been turned OFF or not is made by the detection of the change of the value of the RAM as a target of battery backup in the EVCM 5 from the value immediately before the IGSW 11 is turned OFF.

If the battery terminal OFF has been detected, the module sets the battery terminal OFF experience flag (step S211). Further, if the battery terminal OFF has not been detected, the module clears the battery terminal OFF experience flag (step S212).

Then, the module determines whether a fixed time has elapsed after the IGSW 11 is turned ON (step S215). If the determination result is that the fixed time has elapsed, the cold start condition is unsatisfied (step S222). If the fixed time has not elapsed, the module determines whether the battery terminal OFF experience flag having information that has been previously established is set or not (step S220), and, if the flag is set, the cold start condition is satisfied (step S221). Further, if the battery terminal OFF experience flag has been cleared, the cold start condition is unsatisfied (step S222).

Figure 8:
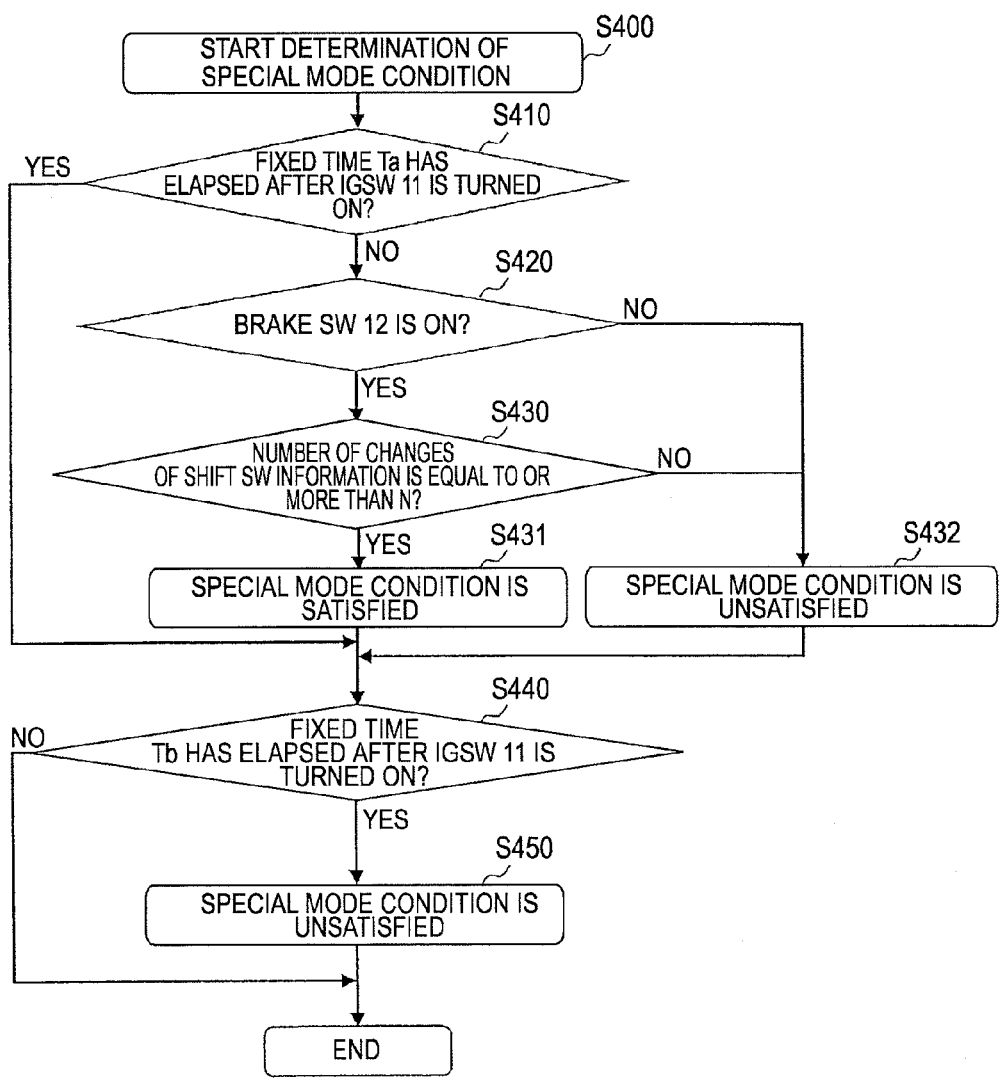
FIG. 8 is a flowchart for explanation of the operation of embodiment 2.

A flow of determination of the special mode condition in embodiment 2 will be explained based on FIG. 8.

When the special mode condition determination is started (step S400), the EVCM 5 determines the satisfaction of the special mode condition only in time Ta after the IGSW 11 is turned ON (step S410). If the BRAKE SW is ON (step S420) and the number of changes of the SHIFT SW information is equal to or more than N (step S430), the special mode condition is satisfied (step S431). Otherwise, the special mode condition is unsatisfied (step S432).

If time Ta has elapsed after the IGSW 11 is turned ON, the module does not perform the operation of the special mode condition. As a result, the special mode condition is held after time Ta has elapsed after the IGSW 11 is turned ON. Then, a fixed time Tb has elapsed after the IGSW 11 is turned ON (step S440), the special mode condition is unsatisfied (step S450). Here, Tb is a significantly long time compared to Ta.

According to the determination flow, if the special mode condition is once satisfied after the IGSW 11 is turned ON, it continues the satisfied state in the fixed time Tb.

Figure 9:
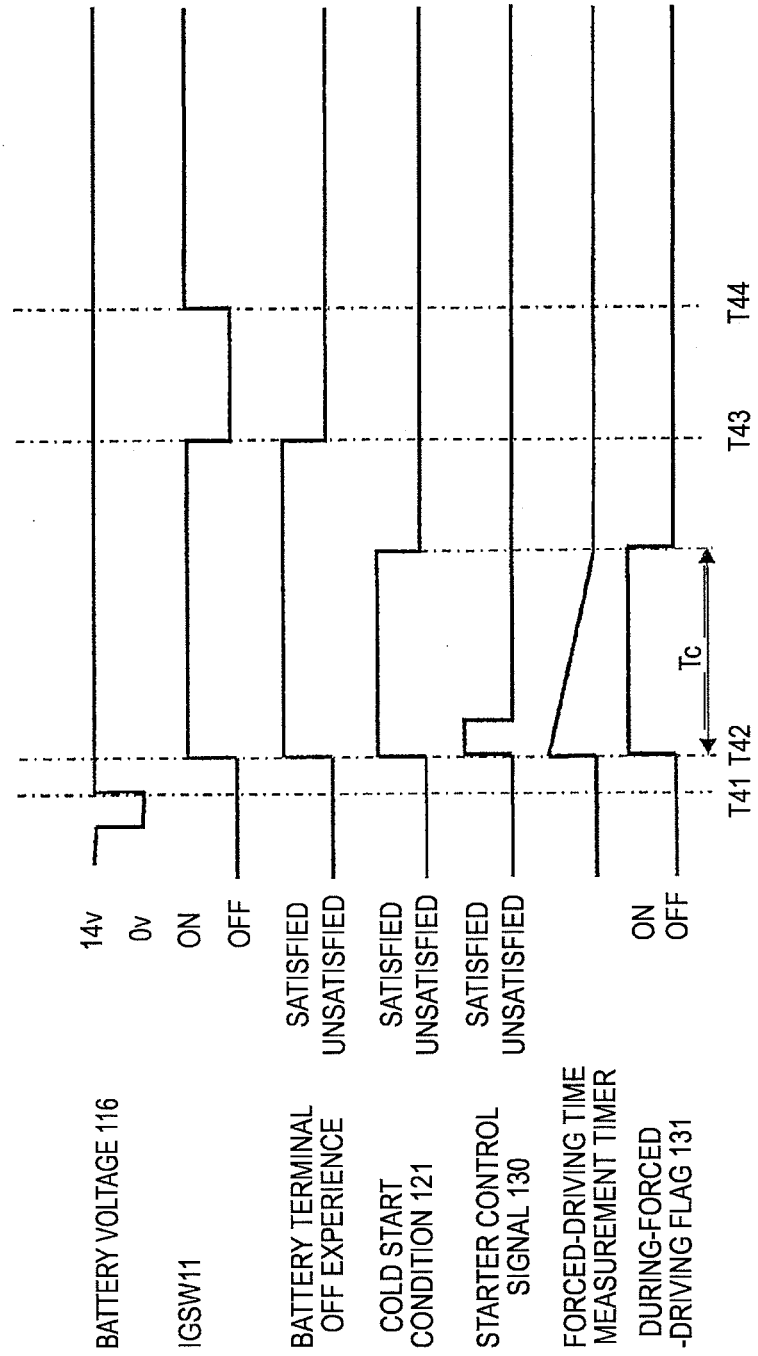
FIG. 9 is a timing chart for explanation of the operation of embodiment 2.

Next, in the flowchart explained in FIG. 7, the operations of the starter control signal 130 and the during-forced-driving flag 131 when the cold start condition 121 is satisfied will be explained based on FIG. 9.

When the battery terminal of the EVCM 5 is turned OFF, the battery voltage 116 once becomes lower to 0 V. If the battery terminal has experienced OFF and the IGSW 11 is turned ON from OFF, the battery terminal OFF experience flag is set and the cold start condition 121 is satisfied.

When the cold start condition 121 is satisfied, the EVCM 5 transmits the starter control signal 130 to the ECM 2 via communication. When the ECM 2 receives the starter control signal 130, it drives the starter 14 and starts the engine 1. If the ECM 2 judges that the engine 1 has completely started, it stops the driving of the starter 14 and transmits an engine start completion signal to the EVCM 5. When the EVCM 5 receives the signal, it stops the transmission of the starter control signal 130.

Further, when the cold start condition 121 is satisfied, the during-forced-driving flag 131 is set, and an initial set value Tc of measurement time is set in a forced driving time measurement timer at the same time. The timer is a subtraction timer and performs subtraction of one at fixed time intervals Ts. The EVCM 5 transmits the during-forced-driving flag 131 to the ECM 2 via communication. Since the ECM 2 controls the engine 1 to the driving side while the during-forced-driving flag 131 is set, the engine is forcibly driven. When the forced driving time measurement timer takes zero, the cold start condition 121 becomes unsatisfied and the during-forced-driving flag 131 becomes unsatisfied.

When the during-forced-driving flag 131 is unsatisfied, the ECM 2 controls the driving of the engine 1 to the stopping side. When the battery terminal of the EVCM 5 is not turned OFF, the battery terminal OFF experience flag and the cold start condition 121 remain unsatisfied and the starter control signal 130 and the during-forced-driving flag 131 remain unsatisfied, and thereby, the engine 1 is never driven.

Figure 10:
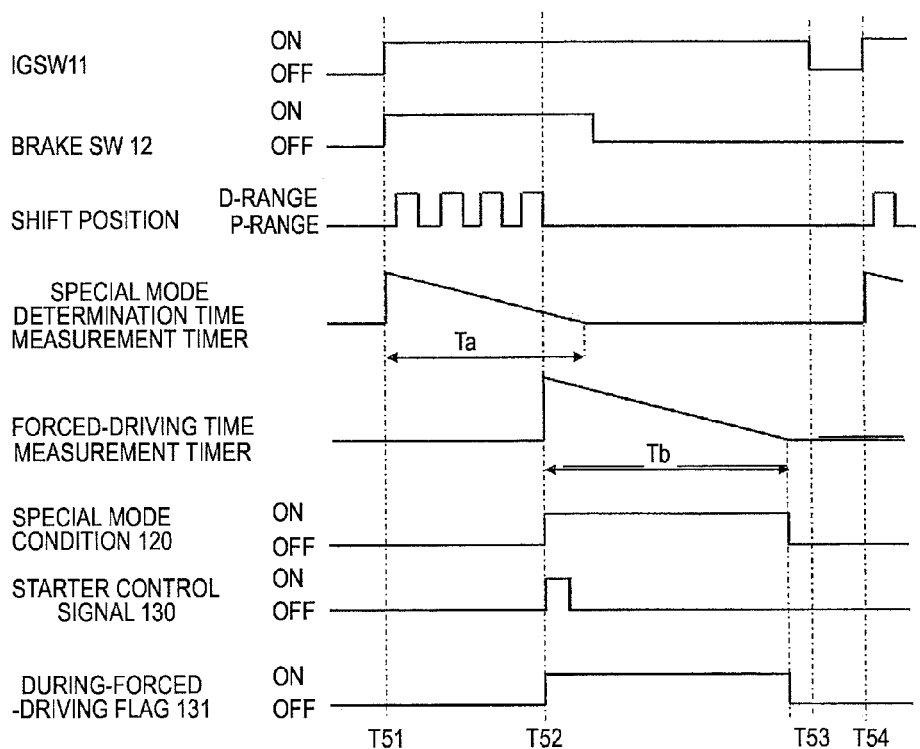
FIG. 10 is a timing chart for explanation of the operation of embodiment 2.

Next, in the flowchart explained in FIG. 8, the operations of the starter control signal 130 and the during-forced-driving flag 131 when the special mode condition 120 is satisfied will be explained based on FIG. 10.

When the IGSW 11 is turned ON from OFF, an initial set value Ta of measurement time is set in a shift position change confirmation timer. The timer is a subtraction timer and performs subtraction of one at fixed time intervals Ts. While the timer measures the time Ta, the BREAK SW continues ON and, when four changes between P-range and R-range are detected, the special mode condition 120 is satisfied.

When the special mode condition 120 is satisfied, the during-forced-driving flag 131 is set, and an initial set value Tb of measurement time is set in a forced driving time measurement timer at the same time. The timer is a subtraction timer and performs subtraction of one at fixed time intervals Ts. When the special mode condition 120 is satisfied, the EVCM transmits the starter control signal 130 to the ECM 2 via communication. When the ECM 2 receives the starter control signal 130, it drives the starter 14 and starts the engine 1. If the ECM 2 judges that the engine 1 has completely started, it stops the driving of the starter 14 and transmits an engine start completion signal to the EVCM 5. When the EVCM 5 receives the signal, it stops the transmission of the starter control signal 130.

The EVCM 5 transmits the during-forced-driving flag 131 to the ECM 2 via communication. Since the ECM 2 controls the engine 1 to the driving side while the during-forced-driving flag 131 is set, the engine is forcibly driven. When the forced driving time measurement timer takes zero, the cold start condition 121 becomes unsatisfied and the starter control signal 130 and the during-forced-driving flag 131 become unsatisfied at the same time.

When the during-forced-driving flag 131 is unsatisfied, the ECM 2 stops the driving of the engine 1. When the battery terminal of the EVCM 5 is not turned OFF, the battery terminal OFF experience flag and the cold start condition 121 remain unsatisfied and the starter control signal 130 and the during-forced-driving flag 131 remain unsatisfied, and thereby, the engine 1 is never driven.

In the embodiment 2, the operation state determination unit makes the cold start condition unsatisfied if the fixed time has elapsed after the ignition switch is turned ON, and thereby, the operation of the engine in the state suitable for the inspection can be maintained in a predetermined time regardless of the satisfaction of the operation stop conditions that characterize the hybrid vehicles. Thereby, the operation of the engine can be maintained in the state suitable for the inspection in a period necessary for the inspection. Further, the maintenance of the operation is stopped after the predetermined time and driving of the vehicle can be performed in the normal vehicle state.

Various modifications and alterations of this invention will be apparent to those skilled in the art without departing from the scope and spirit of this invention, and it should be understood that this is not limited to the illustrative embodiments set forth herein.

What is claimed is:

1. An engine controller of a hybrid vehicle in which an engine and a motor are provided, a battery is charged by an output of a power generator driven by the engine, and the motor is driven by the battery, the engine controller comprising:
    an operation control unit that performs forced driving control of the engine to maintain an operation in a predetermined state suitable for an inspection if a determination that the inspection of the engine by a forced driving operation is requested is made; and
    an operation state determination unit that determines whether a cold start condition is satisfied or unsatisfied based on information containing at least whether a change has occurred from a disconnected state to a connected state of the battery,
    wherein, if the cold start condition is satisfied, the forced driving control of the engine is performed by the operation control unit.

2. The engine controller of the hybrid vehicle according to claim 1, wherein the operation state determination unit determines that the cold start condition is satisfied based on the change from the disconnected state to the connected state of the battery and ON information of an ignition switch that starts the engine.

3. The engine controller of the hybrid vehicle according to claim 2, wherein the operation state determination unit determines that the cold start condition is unsatisfied if a fixed time has elapsed after the ignition switch is turned ON.

4. The engine controller of the hybrid vehicle according to claim 1, wherein the operation state determination unit determines whether a special mode condition is satisfied or unsatisfied based on brake switch information and shift switch information in the hybrid vehicle, and
    the operation control unit performs forced driving control of the engine if the special mode condition is satisfied.

5. The engine controller of the hybrid vehicle according to claim 4, wherein the operation state determination unit determines that the special mode condition is unsatisfied if a fixed time has elapsed after the ignition switch is turned ON.

* * * * *